Aug. 25, 1925.  1,550,732
B. MAY ET AL
RECEPTACLE FOR GARBAGE
Filed May 14, 1924
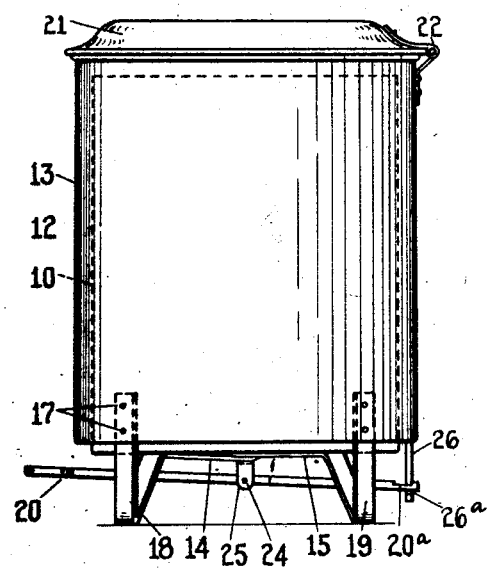
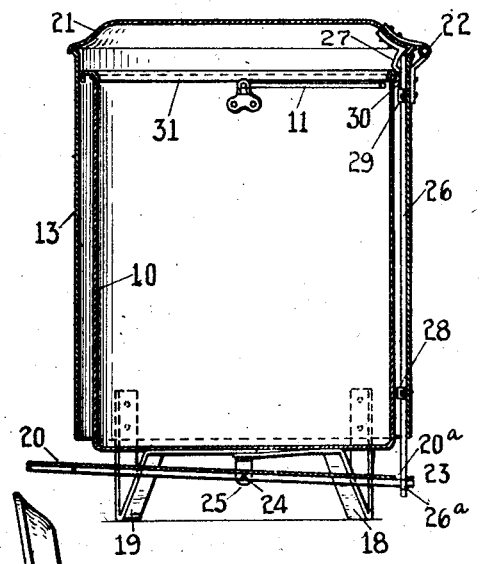
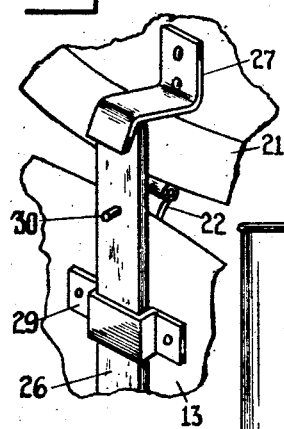
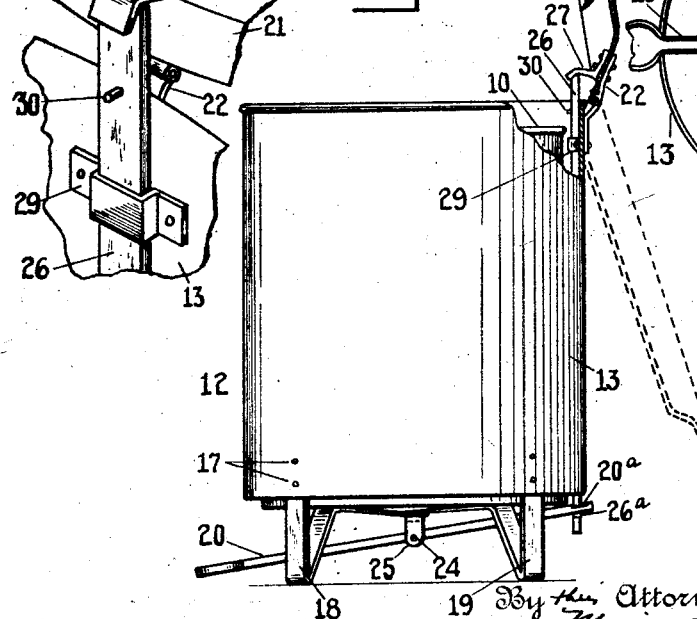
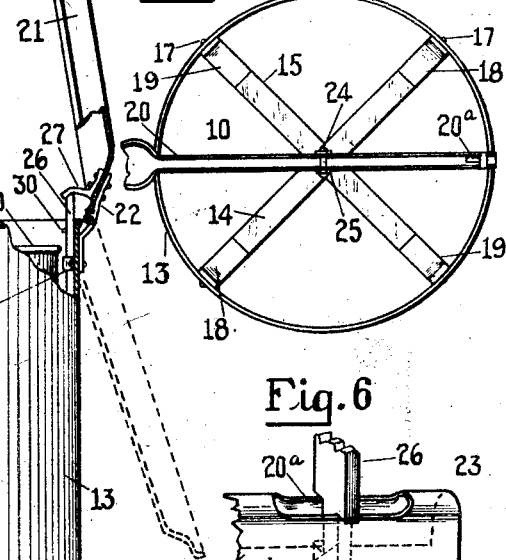
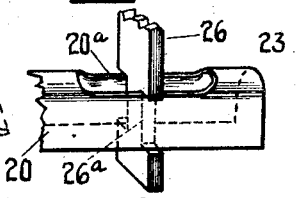
Inventors
Benjamin May
Ell Berenson
Jacob L Diamond
By his Attorney Patented Aug. 25, 1925.

1,550,732

UNITED STATES PATENT OFFICE.

BENJAMIN MAY, ELI BENENSON, AND JACOB L. DIAMOND, OF NEW YORK, N. Y.

RECEPTACLE FOR GARBAGE.

Application filed May 14, 1924. Serial No. 713,142.

*To all whom it may concern:*

Be it known that BENJAMIN MAY, ELI BENENSON, and JACOB L. DIAMOND, citizens of the United States, residing at New York city, in the counties of Kings, Kings, and New York, respectively, and State of New York, have invented certain new and useful Improvements in Receptacles for Garbage, of which the following is a specification.

The invention relates to receptacles for garbage, refuse, waste, and the like, and more particularly to an enclosing stand or casing for such receptacles.

An object of the invention is the provision of a stand or casing with a hinged cover including cover-raising and lowering mechanisms for enclosing a garbage receptacle or the like which is constructed of few and simple parts, is cheap to manufacture, neat and compact in design, and well suited for the purpose desired.

Another object of the invention is the provision in a device of the character described of a cover operating mechanism which is compact and simple in construction, highly efficient in operation, and permits the free removal and insertion of the can.

Other objects of this invention will in part be obvious and in part hereinafter set forth.

The invention accordingly consists in the features of construction, combinations of elements and arrangement of parts which will be exemplified in the construction hereinafter described and of which the scope of application will be indicated in the following claims.

In the accompanying drawing, in which is shown one of the various possible illustrative embodiments of this invention—

Fig. 1 is a view in side elevation of an enclosing stand or casing embodying the invention;

Fig. 2 is a sectional view similar to Fig. 1 showing the interior construction;

Fig. 3 is a view in side elevation, partly in section, similar to Fig. 1 showing the cover-operating mechanism in position for opening and maintaining open the cover;

Fig. 4 is a bottom plan view of the casing receptacle;

Fig. 5 is a fragmentary view of the portion of the cover-operating mechanism adjacent the hinge; and Fig. 6 is a fragmentary view of the lower portion of the cover operating mechanism showing the loose connection between the treadle and thrust rod.

Referring in detail to the drawing, 10 indicates a can or receptacle made of suitable material as for example sheet metal, which may have any suitable shape, preferably cylindrical, and provided with a bail or handle 11 pivotally mounted thereon in the well-known manner.

12 denotes a stand or casing of suitable construction for enclosing the can 10 and may comprise a cylindrical sheet metal body portion 13 to correspond to the shape of the can, having flat metal strips 14 and 15 which are crossed to extend over the bottom opening of said body portion 13, with their ends securely fastened to the latter by any suitable means as rivets 17. Said strips 14 and 15 have portions thereof bent to form legs 18 and 19 respectively for supporting the receptacle 10 above the ground, and to permit the operation of a treadle or foot lever 20, as will hereinafter appear. An enclosing cover or lid 21 is swingably mounted on body portion 13 by means of an outside hinge 22, and operated by a cover or lid-operating mechanism 23, as shown in Figs. 1, 2, or 3, now to be described.

The mechanism 23 includes the treadle or foot lever 20, extending under the raised bottom of the casing 12, and fulcrumed between its ends as at 24 on a downwardly projecting bracket 25 secured to the middle crossed portions of strips 14 and 15. Said treadle 20 may project a short distance beyond the front side of stand 12 to permit operation in the well known manner by the foot of the operator. A thrust rod or bar 26 is slidingly mounted for vertical movement on the interior side of body portion 13 as shown in Fig. 2, and loosely connecting at its lower end with the rear end of the treadle 20. A hooked arm 27 is fastened to lid 21 adjacent the hinge 22 and arranged in the path of movement of rod 26 as shown in Figs. 2 and 3.

The loose connection between the treadle 20 and rod 26 may be formed by providing a slot 20ᵃ adjacent the rear end of the treadle 20, into which a reduced portion 26ᵃ of rod 26 is fitted to operate as clearly shown in Figs. 2, 3 and 6.

There may be also provided an upper and lower guide strap 28 and 29 respectively secured to body portion 13 for guiding bar 26 to move in a vertical path, and for limiting the downward free movement of bar 26. A stop pin 30 may be secured to the latter to engage with the upper edge of strap 29.

With the parts as shown in Figs. 1 and 2, the lid raising and lowering operation is performed by simply pressing one's foot on the extended end of treadle 20. This causes the end opposite the depressed portion of treadle 20 to raise bar 26 vertically upward. Thereupon the upper end of bar 26 engages the arm 27, thereby raising lid 21 to the position shown in Fig. 3. The lid 21 may be manually swung back to the dotted position if desired, since there is no fixed connection between the bar 26 and said lid 21.

A removable guard ring 31 may be provided to extend over the rim of can 10 and to fit the interior of the body portion 13 for preventing any material entering therebetween as shown in Fig. 2.

As will be clear from the foregoing description, a dominant feature of the invention resides in the fact that the thrust bar 26 and the hooked arm 27 are normally disconnected, the former engaging the latter only upon the operation of the treadle. In this way, the cover will be maintained widely open so long as the foot is on the treadle. But the cover may be nevertheless freed for swinging backward if desired.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawing is to be interpreted as illustrative and not in a limiting sense.

Having thus described our invention, we claim as new and desire to secure by Letters Patent:—

1. A casing, a closure therefor, and a closure operating mechanism comprising a treadle, a thrust rod engaged by the treadle for moving the same vertically upward, and an arm secured to the closure normally disconnected from the rod and positioned to extend in the path of movement of the rod for engaging therewith to raise and lower the closure on operating the treadle and to positively hold the closure against accidental displacement when in raised position, said rod and arm being positioned on the interior of the casing and closure.

2. A receptacle, in combination with a casing closely surrounding the same, a closure for the casing and receptacle and a closure raising and lowering means mounted within the casing between the latter and the receptacle, said means including a thrust rod slidingly movable along the interior side of the casing in a guide strap, and an arm secured to the closure normally disconnected from the rod and positioned to extend in the path of movement of the rod for engaging therewith to raise and lower the closure on operating the treadle and to positively hold the closure against accidental displacement when in raised position.

3. In a casing, the combination of a body portion having a raised bottom and a top opening, a cover hinged at the top opening of said body portion, and a cover operating mechanism comprising a thrust rod slidingly mounted on the interior wall of the body portion, a treadle pivotally mounted to extend under the raised bottom of said body portion, loose connecting means between the treadle and said thrust rod, and an arm secured to the cover adjacent the hinged portion thereof positioned to extend in the path of movement of the rod for engaging therewith to raise and lower the cover on operating the treadle, said connecting means comprising a slot in the end of the treadle engaging a reduced portion of the rod to permit the sliding movement of the rod to take place on the pivoting of the treadle.

4. In a casing, the combination of a body portion having a raised bottom and a top opening, a cover hinged at the top opening of said body portion, and a cover operating mechanism normally disconnected from the cover, comprising a thrust rod slidingly mounted on the interior wall of the body portion, a treadle pivotally mounted to extend under the raised bottom of said body portion, loose connecting means between the treadle and said thrust rod, and an arm secured to the cover adjacent the hinged portion thereof positioned to extend in the path of movement of the rod for engaging therewith to raise and lower the cover on operating the treadle, said connecting means comprising a slot in the end of the treadle engaging a reduced portion of the rod to permit the sliding movement of the rod to take place on the pivoting of the treadle, a strap on said body portion for guiding the movement of the thrust rod and a stop on the rod for engaging said strap to limit the downward free movement of the rod.

In testimony whereof we affix our signatures.

BENJAMIN MAY.
ELI BENENSON.
JACOB L. DIAMOND.